(12) United States Patent
Ta et al.

(10) Patent No.: US 11,741,500 B2
(45) Date of Patent: Aug. 29, 2023

(54) PEDESTRIAN THOROUGHFARE PORTABLE MEDIA KIOSK

(71) Applicant: Productive Application Solutions, Inc., Sheridan, WY (US)

(72) Inventors: Peter Ta, Tucson, AZ (US); John Sullivan, Phoenix, AZ (US); Gerald Maliszewski, San Diego, CA (US)

(73) Assignee: Productive Application Solutions, Inc., Sheridan, WY (US)

( * ) Notice: Subject to any disclaimer, the term of this patent is extended or adjusted under 35 U.S.C. 154(b) by 0 days.

(21) Appl. No.: 17/983,545

(22) Filed: Nov. 9, 2022

(65) Prior Publication Data

US 2023/0076300 A1    Mar. 9, 2023

Related U.S. Application Data

(63) Continuation-in-part of application No. 17/962,513, filed on Oct. 9, 2022, which is a continuation-in-part
(Continued)

(51) Int. Cl.
  *G06Q 30/00*      (2023.01)
  *G06Q 30/0251*    (2023.01)
(Continued)

(52) U.S. Cl.
  CPC ....... *G06Q 30/0266* (2013.01); *G05D 1/0022* (2013.01); *G05D 1/0094* (2013.01);
(Continued)

(58) Field of Classification Search
  CPC ........... G06Q 30/0244; G06Q 30/0252; G06Q 30/0267
(Continued)

(56) References Cited

U.S. PATENT DOCUMENTS 4,259,660 A * 3/1981 Oliver ................. B60Q 1/2611
                                              116/40
6,971,070 B2 * 11/2005 Obradovich .......... B60W 50/14
                                              715/835
(Continued)

FOREIGN PATENT DOCUMENTS

FR    2578996 A  * 9/1986 ........... G07B 13/045
FR    2578996 A1 * 9/1986 ............. G09F 21/04
(Continued)

OTHER PUBLICATIONS

Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*

(Continued)

*Primary Examiner* — James A Reagan
(74) *Attorney, Agent, or Firm* — Law Office of Gerald Maliszewski; Gerald Maliszewski

(57) ABSTRACT

A system and method are provided for a pedestrian thoroughfare portable media projection kiosk. The method provides a portable kiosk chassis located in a pedestrian thoroughfare. A media projection subsystem attached to the kiosk projects a media message and creates a media enablement signal. The media message may be a visual display, an audio broadcast, or both. The method verifies that media has been projected in response to receiving a media enablement signal. Verification information is supplied that includes the media enablement signal, and the verification information is communicated to a server. The verification information may be communicated using a cellular telephone, an IEEE 802.11 Wireless Local Area Network (WLAN) device, an IEEE 802.15 Wireless Personal Area Network (WPAN) device, or combinations thereof. Alternatively, or in addition, the kiosk (Continued)

may provide a publically accessible cellular telephone booster, a WLAN access point (AP), WPAN AP, or combinations thereof.

24 Claims, 7 Drawing Sheets

Related U.S. Application Data of application No. 17/830,783, filed on Jun. 2, 2022, which is a continuation-in-part of application No. 17/830,412, filed on Jun. 2, 2022, which is a continuation-in-part of application No. 17/230,008, filed on Apr. 14, 2021, now Pat. No. 11,270,349, which is a continuation-in-part of application No. 17/201,419, filed on Mar. 15, 2021, which is a continuation-in-part of application No. 17/179,574, filed on Feb. 19, 2021, now Pat. No. 11,257,120, which is a continuation-in-part of application No. 17/168,313, filed on Feb. 5, 2021, which is a continuation-in-part of application No. 17/133,722, filed on Dec. 24, 2020, now Pat. No. 11,055,743, which is a continuation-in-part of application No. 17/097,256, filed on Nov. 13, 2020, which is a continuation-in-part of application No. 17/071,043, filed on Oct. 15, 2020, now Pat. No. 11,037,199, which is a continuation-in-part of application No. 17/023,546, filed on Sep. 17, 2020, now Pat. No. 10,991,007, which is a continuation of application No. 17/007,575, filed on Aug. 31, 2020, now Pat. No. 11,468,477, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 62/779,972, filed on Dec. 14, 2018.

(51) Int. Cl.
*G06Q 30/0242* (2023.01)
*G06F 16/487* (2019.01)
*G05D 1/00* (2006.01)

(52) U.S. Cl.
CPC ....... *G06F 16/487* (2019.01); *G06Q 30/0244* (2013.01); *G06Q 30/0252* (2013.01); *G06Q 30/0267* (2013.01)

(58) Field of Classification Search
USPC .......... 705/14.63, 14.62, 14.49, 14.4; 725/32
See application file for complete search history.

(56) References Cited

U.S. PATENT DOCUMENTS

| | | | | |
|---|---|---|---|---|
| 7,347,017 B2* | 3/2008 | Shaffer, Jr. | ............... | G09F 21/04 296/21 |
| 7,463,898 B2* | 12/2008 | Bayne | ................ | H04M 1/0247 455/575.1 |
| 8,712,630 B2* | 4/2014 | Walwer | ............. | G06Q 30/0273 705/14.62 |
| 9,047,256 B2* | 6/2015 | Carlson | ................ | G06Q 30/02 |
| 9,076,336 B2* | 7/2015 | Tippelhofer | .......... | G08G 1/148 |
| 9,720,519 B2* | 8/2017 | Verma | ..................... | G06F 3/017 |
| 9,763,271 B1* | 9/2017 | Gabel | .................... | G06Q 30/08 |
| 9,830,713 B1* | 11/2017 | Walker | ................ | H04N 23/90 |
| 9,939,287 B2* | 4/2018 | Castellucci | ........ | G01C 21/3476 |
| 10,045,390 B2* | 8/2018 | Chong | ............... | H04B 7/18504 |
| 10,382,579 B2* | 8/2019 | Mevissen | .............. | H04L 67/306 |
| 10,482,766 B2* | 11/2019 | Mowatt | .................. | G08G 1/144 |
| 10,733,891 B2* | 8/2020 | Chow | ....................... | G08G 1/04 |
| 10,839,426 B2* | 11/2020 | e Costa | ............. | G06Q 30/0266 |
| 11,270,349 B2* | 3/2022 | Maliszewski | ........ | H04N 9/3194 |
| 11,314,399 B2* | 4/2022 | Davis | ................. | G02B 27/0093 |
| 11,548,633 B2* | 1/2023 | Ratti | .................... | B64C 39/024 |
| 2002/0009978 A1* | 1/2002 | Dukach | .................... | G08G 1/01 455/99 |
| 2006/0129451 A1* | 6/2006 | Kohanim | ............... | G06Q 30/02 705/14.58 |
| 2006/0265922 A1* | 11/2006 | Shaffer, Jr. | ............ | G09F 21/048 40/591 |
| 2009/0084009 A1* | 4/2009 | Vandergriff | ............. | G09F 13/18 40/546 |
| 2011/0131235 A1* | 6/2011 | Petrou | ................... | G06F 16/532 707/769 |
| 2011/0161160 A1* | 6/2011 | Carlson | ................. | G06Q 30/02 705/14.41 |
| 2012/0022727 A1* | 1/2012 | Flanigan | .............. | G01C 23/005 701/16 |
| 2012/0066071 A1* | 3/2012 | Thomas | ................. | G06Q 30/02 705/14.66 |
| 2012/0185325 A1* | 7/2012 | Shani | .................. | G06Q 30/0275 705/14.43 |
| 2012/0245966 A1* | 9/2012 | Volz | ....................... | G06Q 10/02 705/5 |
| 2013/0304565 A1* | 11/2013 | Saccoman | .......... | G06Q 30/0242 705/14.41 |
| 2013/0307706 A1* | 11/2013 | Kriezman | .............. | B60Q 1/503 340/988 |
| 2014/0214319 A1* | 7/2014 | Vucetic | ............. | G01C 21/3446 701/533 |
| 2014/0279021 A1* | 9/2014 | MacNeille | ......... | G06Q 30/0266 705/14.63 |
| 2014/0309865 A1* | 10/2014 | Ricci | ...................... | G06F 3/0481 701/36 |
| 2015/0123818 A1* | 5/2015 | Sellschopp | ....... | G08G 1/096816 340/932.2 |
| 2015/0254721 A1* | 9/2015 | Rad | .................... | G06Q 30/0266 705/14.63 |
| 2015/0279210 A1* | 10/2015 | Zafiroglu | ................ | G08G 1/065 340/932.2 |
| 2016/0041628 A1* | 2/2016 | Verma | ................... | G06F 3/0304 345/156 |
| 2016/0080346 A1* | 3/2016 | Kuchta | ................... | G06Q 50/01 705/44 |
| 2016/0086391 A1* | 3/2016 | Ricci | ...................... | G06Q 30/06 701/29.3 |
| 2016/0116293 A1* | 4/2016 | Grover | ................... | G01C 21/34 701/23 |
| 2016/0191879 A1* | 6/2016 | Howard | ............... | H04N 9/3147 348/745 |
| 2016/0267539 A1* | 9/2016 | Saah | ...................... | H04W 4/80 |
| 2016/0292744 A1* | 10/2016 | Strimaitis | .......... | G06Q 30/0269 |
| 2016/0293018 A1* | 10/2016 | Kim | ...................... | B64C 39/024 |
| 2017/0132960 A1* | 5/2017 | Kis-Benedek Pinero | ................... | G06F 1/1637 |
| 2017/0309170 A1* | 10/2017 | Wang | ..................... | G08G 1/146 |
| 2017/0374502 A1* | 12/2017 | Gabel | .................... | G06Q 50/26 |
| 2018/0053215 A1* | 2/2018 | e Costa | ............. | G06Q 30/0267 |
| 2018/0186309 A1* | 7/2018 | Batten | ..................... | B60Q 1/56 |
| 2018/0186311 A1* | 7/2018 | Mason | ................... | B60R 21/01 |
| 2019/0121522 A1* | 4/2019 | Davis | ................. | G06F 3/04815 |
| 2019/0122455 A1* | 4/2019 | Howard | ............... | G05D 1/0202 |
| 2019/0135180 A1* | 5/2019 | Watatsu | ..................... | B60R 1/00 |
| 2019/0149782 A1* | 5/2019 | Mori | ................... | H04N 9/3147 348/383 |
| 2021/0001724 A1* | 1/2021 | Dobashi | ................. | B60K 35/00 |
| 2021/0129983 A1* | 5/2021 | Ratti | ........................ | B64B 1/44 |
| 2022/0317868 A1* | 10/2022 | Davis | .................. | G02B 27/0172 |
| 2022/0326841 A1* | 10/2022 | Davis | ................. | G06F 3/04883 |

FOREIGN PATENT DOCUMENTS

| | | | | |
|---|---|---|---|---|
| GB | 2402254 A | * | 12/2004 | .......... G06Q 20/127 |
| JP | 2010026474 A | * | 2/2010 | .......... G09F 21/048 |

(56) References Cited

FOREIGN PATENT DOCUMENTS

| JP | 2018072077 A | * | 5/2018 | ............. G01S 19/14 |
| JP | 2018205399 A | * | 12/2018 | ............. G09F 21/04 |
| WO | WO-2008135617 A1 | * | 11/2008 | ........... G08G 1/0175 |

OTHER PUBLICATIONS

Ted Morris et al. A Comprehensive System for Assessing Truck Parking Availability Final Report. (Jan. 2017). Retrieved online Aug. 26, 2020. https://www.dot.state.mn.us/ofrw/PDF/assessing-truck-parking.pdf (Year: 2017).*

Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1&isAllowed=y (Year: 2015).*

Florian Alt. A Design Space for Pervasive Advertising on Public Displays. (Dec. 7, 2012). Retrieved online Aug. 13, 2020. https://pdfs.semanticscholar.org/4bef/aba88eb1d14e81dcd610658bccbb-f287b770.pdf (Year: 2012).*

Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*

Technoframe. LED Bus Screens. (Nov. 18, 2011). Retrieved online Aug. 13, 2020. https://technoframe.com/led-bus-screens (Year: 2011).*

Technobob. MMOV Takes Projection Mapping on the Road. (May 11, 2011). Retrieved online Jul. 11, 2021. https://technabob.com/blog/2011/05/11/mmov-projection-mapping-vehicle/ (Year: 2011).*

The Graffiti Research Lab. Projection Bombing. (circa 2008). Retrieved online Jul. 11, 2021. https://www.instructables.com/PROJECTION-BOMBING/ (Year: 2008).*

Projectable Objects. Tutorial: The Easier Way to Projection Map for Advertisement on a Building. (Oct. 13, 2014). Retrieved online Jul. 11, 2021. https://projectileobjects.com/2014/10/13/the-easier-way-to-projection-map-for-advertisement-tutorial/ (Year: 2014).*

IEEE—TheBridgeMagazine(2017) .RetrievedonlineNov. 9, 2020. http://nkn.ieee.org/wp-content/uploads/2019/02/Bridge_UAVS_2017.pdf (Year: 2017).*

* cited by examiner

PEDESTRIAN THOROUGHFARE PORTABLE MEDIA KIOSK

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to the use of a portable kiosk and, more particularly, to a portable kiosk capable of displaying media messages and verifying message display.

2. Description of the Related Art

Market research shows that outdoor billboard marketing space has increasingly become harder to find and, hence, more valuable. At the same time, automotive vehicles are one of the most costly expenses incurred by the average consumer. Ironically, most automobiles sit idle for a large portion of the day. U.S. Pat. No. 10,796,340, entitled SYSTEM AND METHOD FOR TARGETING THE DISTRIBUTION OF MEDIA FROM A MOBILE PLATFORM, invented by Peter Ta et al., and filed on Oct. 14, 2019, addresses to problem of finding more outdoor advertising space by providing an automotive targeted parking system that adds to an automobile the additional feature of a media display subsystem, and which may also include a Wireless Local Area Network (WLAN) IEEE 802.11 (WiFi) access point (hotspot).

While the above-described system addresses the provision of additional outdoor advertising through the "gig economy" use of automobiles, the act of parking remains a potential issue. Parking in many desirable advertising locations in metropolitan areas is often limited to one or two hours only. Further, the necessity of frequently changing parking spots can become a burden and may make the use of their automobile as a mobile media center impractical for some owners.

Parent U.S. Pat. No. 10,991,007, entitled AERIAL BILLBOARD, invented by Peter Ta et al, and filed on Sep. 17, 2020, provides for the use of aircraft, such as unmanned aerial vehicles (UAVs), as another type of media platform. However, battery operated devices have time limitations due to the need for recharging, and potential air space legal restrictions may exist in some regions.

Parent U.S. Ser. No. 17/168,313, entitled SYSTEM AND METHOD FOR THIRD PARTY MOBILE MEDIA CONTROL, filed on Feb. 5, 2021 extends display potential by describing a pedestrian mobile media system kiosk chassis with a movement subsystem configured for moving the chassis on a pedestrian thoroughfare. The system includes a media projection subsystem and/or a publically accessible wireless local area network (WLAN) access point (AP) or wireless personal area network (WPAN) AP, a location subsystem, and a wireless communications subsystem having an interface to receive verification information including the chassis geographic location and to receive chassis geographic location destination instructions. However, it may not be possible to move a display along a pedestrian thoroughfare in all environments.

Parent U.S. Pat. No. 11,270,349, entitled PORTABLE BILLBOARD, filed on Apr. 4, 2021, and issued on Mar. 8, 2022, describes a portable media projection subsystem (MPS) and targeting subsystem, where the MPS verifies its position in a value weighted target stationary location, and communicates verification information.

It would be advantageous if the above-mentioned portable MPS and display systems could be engaged without strict requirements for motion, location tracking, or location verification.

It would be advantageous if the portable MPS could be operated from leased pieces of real property, and updated with media messages in real-time.

SUMMARY OF THE INVENTION

A system and method are disclosed herein for a portable kiosk, which may also be referred to as pedestrian thoroughfare kiosk or sandwich board, that projects media messages. The kiosk verifies that media is actually projected and communicates the verification information to a central server or server Blockchain. The media messages may be negotiated programmatically and/or distributed between kiosk sponsors and local facilities. The system may optionally determine its location and include the determined location with the verification information. In some aspects, the portable kiosk may act as a publically accessible WiFi hotspot or cellular telephone booster. In other aspects, the kiosk may act as a ticket box office site or public event gate keeper.

Accordingly, a method is provided for a pedestrian thoroughfare portable media projection kiosk. The method provides a portable kiosk chassis located in a pedestrian thoroughfare. A media projection subsystem is attached to the kiosk projects a media message and creates a media enablement signal when the kiosk is projecting media. In one aspect, the enablement signal is created when the kiosk is projecting media from a stationary location. The media message may be a visual display, an audio broadcast, or both. The method verifies receipt of the media enablement signal, which is included as verification information communicated to a server. The verification information may be communicated using a cellular telephone, an IEEE 802.11 Wireless Local Area Network (WLAN) device, an IEEE 802.15 Wireless Personal Area Network (WPAN) device, or combinations thereof. Alternatively, or in addition, the kiosk may provide a publically accessible cellular telephone booster, Internet signal booster, a WLAN access point (AP), WPAN AP, or combinations thereof.

In one aspect, the kiosk may include a location subsystem, and a weighted value is cross-referenced to a kiosk chassis stationary location. Alternatively, an approximate kiosk location can be determined based on its ability to communicate with a proximately located access point (e.g., WiFi access point) having a known location. The kiosk chassis location weighted value is responsive to factors such as proximate vehicular traffic, line of sight, proximate pedestrian traffic, height, proximity to cultural events, proximity to cultural facilities, a type of media being projected, a time of day, a day of the week, a date, a length of time the media is projected, and combinations thereof. In other aspects, the kiosk is mobile within the pedestrian thoroughfare as controlled, for example, by an autonomous movement application. Alternatively, a location subsystem or motion detector acts to verify that the kiosk is stationary for at least a minimum duration of time, and the type of media being projected may be dependent upon the detection of proximate pedestrians.

The media messages may be uploads that are received from the server for projection by the media projection subsystem. This media may be projected programmatically in real-time or near real-time. Alternatively, or in addition, the media messages are stored in a kiosk local memory library. The kiosk may incorporate local environment sensors, such as a camera to record images of the geographic location proximate to the kiosk chassis, which are then communicated to the server. In another aspect the kiosk may provide a directory of addresses, persons, services, businesses, events, the location of specific items in a nearby facility, and combinations thereof. In another variation the kiosk may provide a keypad or scanner user interface (UI), and which might further include a microphones, cameras, mouse, audio speaker, stylus, or touchscreen, to name a few examples, for use by a human to read and input authorization information such as personal information, banking information, a barcode, a quick response (QR) code, or combinations thereof. The kiosk is able to transmit the authorization information to the server, receive ticket data in response to the authorization information, and supply paper or electronic tickets, responsive to the ticket data.

Additional details of the above-described method, and a pedestrian thoroughfare portable kiosk media projection system, are provided below.

DETAILED DESCRIPTION

Figure 1A:
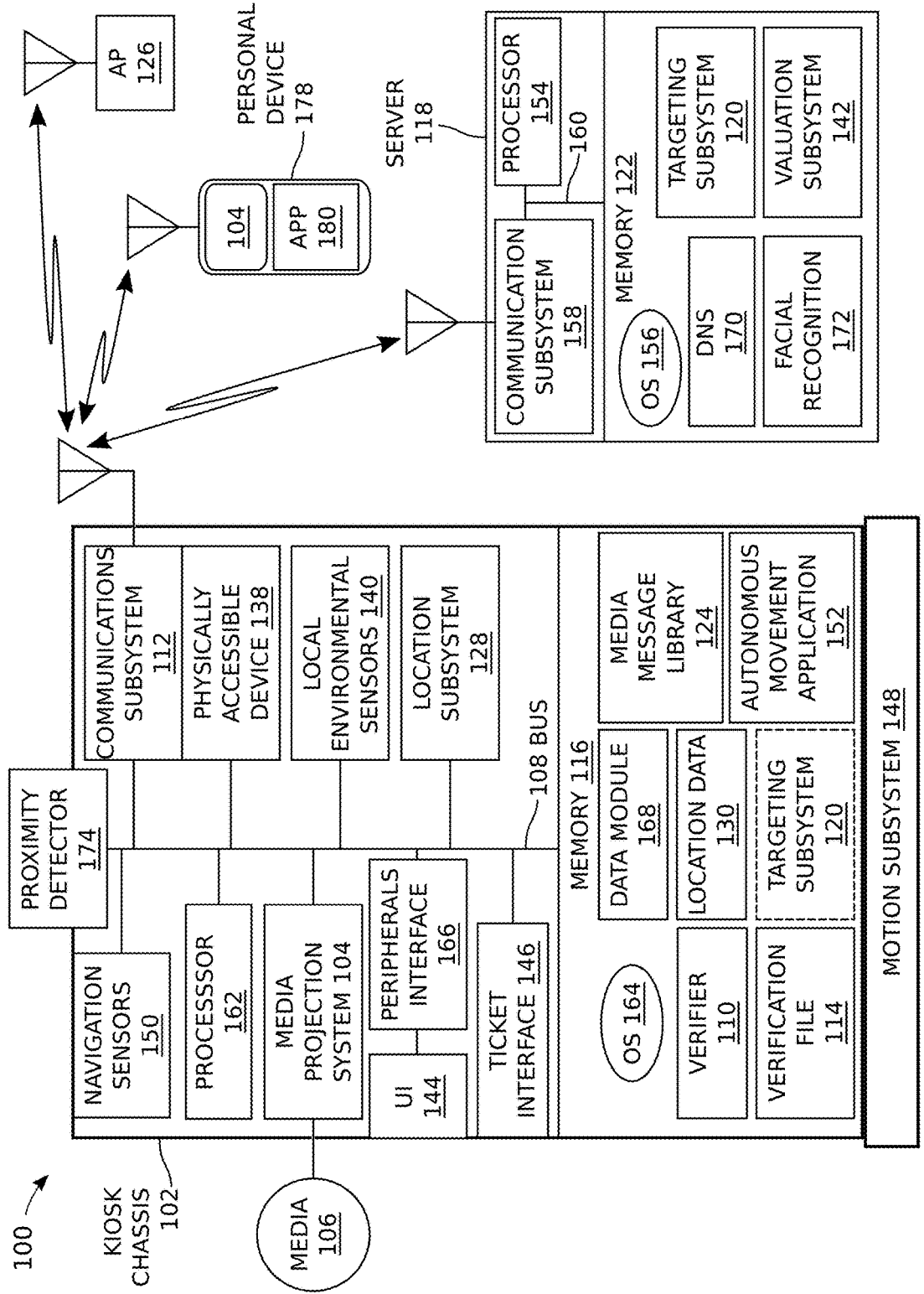
FIGS. 1A through 1E are schematic block diagrams and examples of a pedestrian thoroughfare portable kiosk media projection system.

FIGS. 1A through 1E are schematic block diagrams and examples of a pedestrian thoroughfare portable kiosk media projection system. The system 100 comprises a pedestrian thoroughfare portable kiosk chassis 102. As used herein a portable kiosk is one that is not permanently attached to a structure such as a sidewalk, floor, or wall. A pedestrian thoroughfare is a surface designed exclusively for human foot traffic, such as a sidewalk, the area adjacent a facility pedestrian door, the aisles of a store, or a shopping mall to name a few examples. Although portable kiosks are primarily described, the system described herein can also be enabled in permanently stationed kiosks. A media projection subsystem (MPS) 104 is attached to the kiosk chassis 102 and comprises an interface to receive media, an interface to selectively project the media 106, and an interface to supply a media enablement signal in response to the media being projected. In one aspect, the media enablement signal is supplied when media is projected from a stationary location. As described in more detail below, the interface to receive media and the interface to supply the media enablement signal are typically the same interface on bus line 108. The media projection subsystem MPS 104 may project displayed images, broadcast audio, or a combination thereof.

A verifier 110 has an interface to receive the media enablement signal on line 108 and an interface on line 108 to supply verification information including the media enablement signal. As shown, the verifier may be a software application including processor executable steps stored in memory, but alternatively the verifier may be enabled in hardware using combinational logic devices (not shown). A kiosk communication subsystem 112 has an interface on line 108 to receive verification information and an interface to communicate the verification information to a server 118. In one aspect, the verification information is stored as a verification file 114 in a kiosk local non-transitory memory 116. The verification file 114 may be periodically offloaded via a peripherals interface to a portable memory device (e.g., a thumb drive) or periodically transmitted using the communication subsystem 112. Alternatively, the verification information may be transmitted to the server in real-time, or near real-time using a transceiver. Communication devices are described in detail below.

In one aspect, the system 100 may include a targeting subsystem 120 cross-referencing a weighted value to a kiosk chassis stationary location or a kiosk approximate location. The targeting subsystem 120 may either be located in kiosk memory 116, as shown in phantom, or in a non-transitory memory 122 of the server 118. The kiosk chassis location weighted value may be responsive to factors such as proximate vehicular traffic, line of sight, proximate pedestrian traffic, height, proximity to cultural events, proximity to cultural facilities, the type of media being projected, time of day, day of the week, date, length of time the media is projected, type of kiosk, type of display, the number of displays configured with the kiosk, and combinations thereof.

In one aspect, the kiosk communications subsystem 112 receives media uploads from the server 118 and provides the media uploads to the media projection subsystem 104 for projection. The media uploads may be stored in a media message library 124, in kiosk local memory 116 or presented to the MPS in real-time. As would be understood in the art, portions of the real-time media messages may be buffered momentarily in a buffer memory (not shown).

Various aspects of the subsystems and components described above can be used to support public service announcements or digital out-of-home (DOOH), also known as programmatic DOOH, pDOOH, or simply programmatic advertising. With the aid of computers and the Internet, cellular links, and WiFi communications, media messages can be based upon specific conditions or external triggering data, such as weather, time of day, location, emergencies, child abductions, sporting events, or a combination of specific triggering events.

Once specific triggering events are established, media can be automatically and repeatedly directed to corresponding locations, kiosks, displays and/or multiple types of displays, referred to herein as media slots, without having to make individual direct decisions. In one aspect, access to the media slots is granted on an auction basis, where message providers (e.g., advertisers or public service organizations) bid for the use of the media slots. Again, once bids are placed, media slot access can be granted automatically without the message providers having to make individual decisions. Alternatively, media slot access may be based upon priority or preexisting relationships, alternative forms of compensation, or with the understanding that message provider has initial access to a media slot that is granted with the understanding that the message provider (automatically) submits the highest bid. As another alternative, arrangements can be made to give a message provider continuous, uninterrupted access to certain selected media slots.

In one aspect, the system described herein may act as a demand side platform (DSP). The DSP may entail a website that offers various display types, mobile platforms, stationary platforms, and a calender, to name a few possible media slot characteristics, to various message providers as described in parent application Ser. No. 17/830,412, filed Feb. 6, 2022, entitled MEDIA CLEARINGHOUSE, which is incorporated herein by reference. Bids for these media slots can be automatically submitted by message providers, as mentioned above, or submitted on a piece-by-piece, future, or real-time basis. Alternatively, the system described herein may perform as a supply side platform (SSP) to offer available media slots to message providers or DSPs. The system can also be used to collect data and key performance indicators (KPIs) by collecting local environment and pedestrian data, to measure the success of media distribution campaigns.

The kiosk communication subsystem 112 may comprise a cellular telephone, an IEEE 802.11 Wireless Local Area Network (WLAN) device, an IEEE 802.15 Wireless Personal Area Network (WPAN) device, or combinations thereof. If the communications subsystem 112 is comprised of just a WLAN or WPAN, a proximately located WLAN or WPAN access point (AP) 126 may be used to enable communications between the kiosk system 100 and the server 118. For example, the AP 126 may be located in a nearby store or public facility. In one aspect, the kiosk communications subsystem 112 may comprise a publically accessible device 138 such as a cellular telephone booster, Internet signal booster, a WLAN AP, WPAN AP, and combinations thereof. To acquire these services a pedestrian may need to input their phone number or internet protocol (IP) address, or watch a particular media message displayed on the media projection subsystem or downloaded to their cell phone.

As noted above, in some aspects the determination of location is of concern. In that case the kiosk chassis 102 may comprise a location subsystem 128 attached to the kiosk chassis to supply location information. The kiosk communications subsystem 112 may communicate the location information to the server 118 directly through a cellular network, through a WLAN or WPAN device to a proximately located WLAN or WPAN AP 126, or it may be stored in memory's 116 location data file 130 for retrieval at a later time. Examples of potential location subsystem devices are presented in detail below. In one aspect, the verifier 110 has an interface on line 108 to receive the location information and an interface on line 108 to supply verification information including a location enablement signal when the kiosk chassis is stationary for a predetermined minimum duration of time. Otherwise, the location information may be an approximate location, or a travel route in the case of a locally moving kiosk. The proximately located access point 126 may relay communications between the kiosk communications subsystem 112 and the server 118. In this case, the ability of the kiosk to communicate with the AP acts as a means of approximately locating the kiosk, since WiFi and Bluetooth communications, for example, are limited in range. In some aspects, the kiosk communications subsystem 112 may be configured to communicate with a group of APs (not shown) having known locations.

In one aspect the kiosk 102 further comprises local environment sensors 140 to receive local environment data supplied by a camera, microphone, weather sensor, odor sensor, photodetector, chemical sensor, wireless spectrum receiver, wireless service traffic analyzer, radiation sensor, air quality monitor, or combinations thereof. The kiosk communication subsystem 112 may transmit the local environment data to the server 118 or store the data in local memory 116. For example, a camera may supply images of a geographic location proximate to the kiosk chassis.

In practice, the kiosk chassis 102 may be managed by a first entity, e.g., the manager of a nearby facility. Perhaps the first entity is a store owner who wheels the kiosk out in front of their store every morning, and wheels it back into the store when they close at night. In addition to supplying media messages provided on behalf of the first entity, the media projection subsystem 104 may also, or alternatively, project media messages supplied by a second entity message provider, for example, a local utility warning of an impending brown-out. The supply of media messages may be channeled indirectly from the second entity through a DSP, SSP, or kiosk owner. A valuation subsystem 142, perhaps enabled as a software application in server memory 122 directly or operatively (indirectly through intermediating DSP or SSP agencies), may determine a reward to the first entity from the second entity in response to the projection of the second entity's media message. As noted above, the media projection subsystem 104 also typically projects a media message supplied on behalf of the first entity (e.g., an advertisement for the facility managed by the first entity). The media message may be a series of consecutive repeating messages. For example, the MPS 104 may project a series of 8 repeating messages, with 1 message associated with the first entity and the other 7 messages associated with other different entities.

Figure 1B:
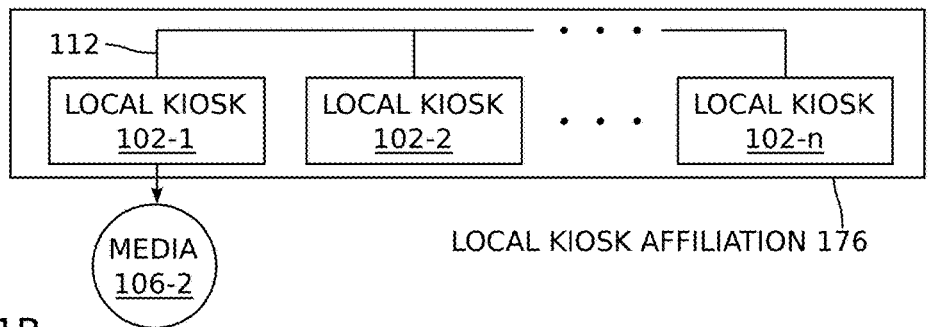

As another alternative shown in FIG. 1B, a third entity affiliation of local kiosks 176 may exist. These local kiosks 102-1 through 102-$n$, where n is an integer greater than one, may be pedestrian thoroughfare kiosks associated with proximately located facilities. For example, the affiliation may be businesses located in the same mall or on the same street. In one aspect, a first entity (e.g., associated with kiosk 102-1) has the option of displaying media messages provided by these local facilities (e.g., media 106-2 supplied by kiosk 102-2).

Returning to FIG. 1A, in one aspect the system 100 includes a proximity detection device 174 connected to the kiosk chassis 102 to supply a detection signal on line 108 in response to determining the proximate presence of pedestrians. The proximity detection device may be enabled as a camera or a photodiode detector for example. Alternatively or in addition, the proximity detection device may detect radio frequency (RF) signals or IP addresses from pedestrians carrying cell phones. The media projection subsystem 104 may be selectively engaged in response to the detection signal. For example, in the default state the MPS 104 may be turned off to conserve power until a pedestrian is detected. Alternatively, more sophisticated analysis systems may use camera images to determine pedestrian characteristics. For example, if a child is detected, the media messages may be modified to curry to a child audience. If an adult woman is detected, the media messages may be directed to information more likely to interest a woman. If the kiosk is enabled with some autonomous movement features, the kiosk may turn or move such that the MPS 104 is more clearly presented to the detected pedestrian.

Figure 1C:
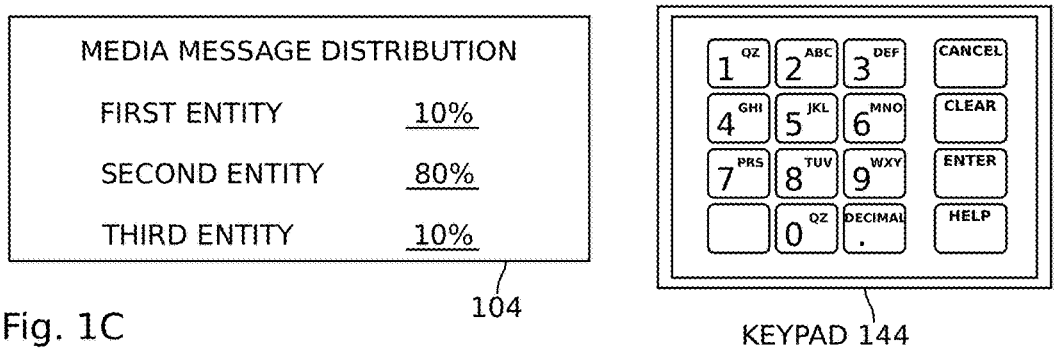

FIG. 1C depicts an exemplary manager user interface (UI). The manager UI 144 permits the selection of media message distribution between the first entity, the second entity, and the third entity. The manager UI 144 may enabled as part of the kiosk, as shown in FIG. 1A or alternatively, enabled as a cell phone application or website page (not shown).

In another aspect the kiosk can act as a ticket booth, ticket will-call facility, or gate keeper. In this case, the UI 144 of FIG. 1A may also be a pedestrian user interface which includes a keypad, touchscreen, camera, microphone, speaker, mouse, stylus, a scanner, wireless interfaces, or other conventional device to read pedestrian authorization information such as personal information, banking information, a barcode, a quick response (QR) code, or combinations thereof. The kiosk communication subsystem 112 transmits the pedestrian authorization information to the server 118, which in this case acts as a ticket issuer. The communication subsystem 112 receives ticket data in response to the pedestrian authorization information and provides a ticket via a ticket interface 146, which may be a printer to supply paper tickets, responsive to the ticket data. Alternatively, a display (e.g., MPS 104) may project electronic tickets responsive to the ticket data in the form of QR codes or wireless mediums such as AirDrop, text (SMS), email, WiFi, or Bluetooth communications.

Figure 1E:
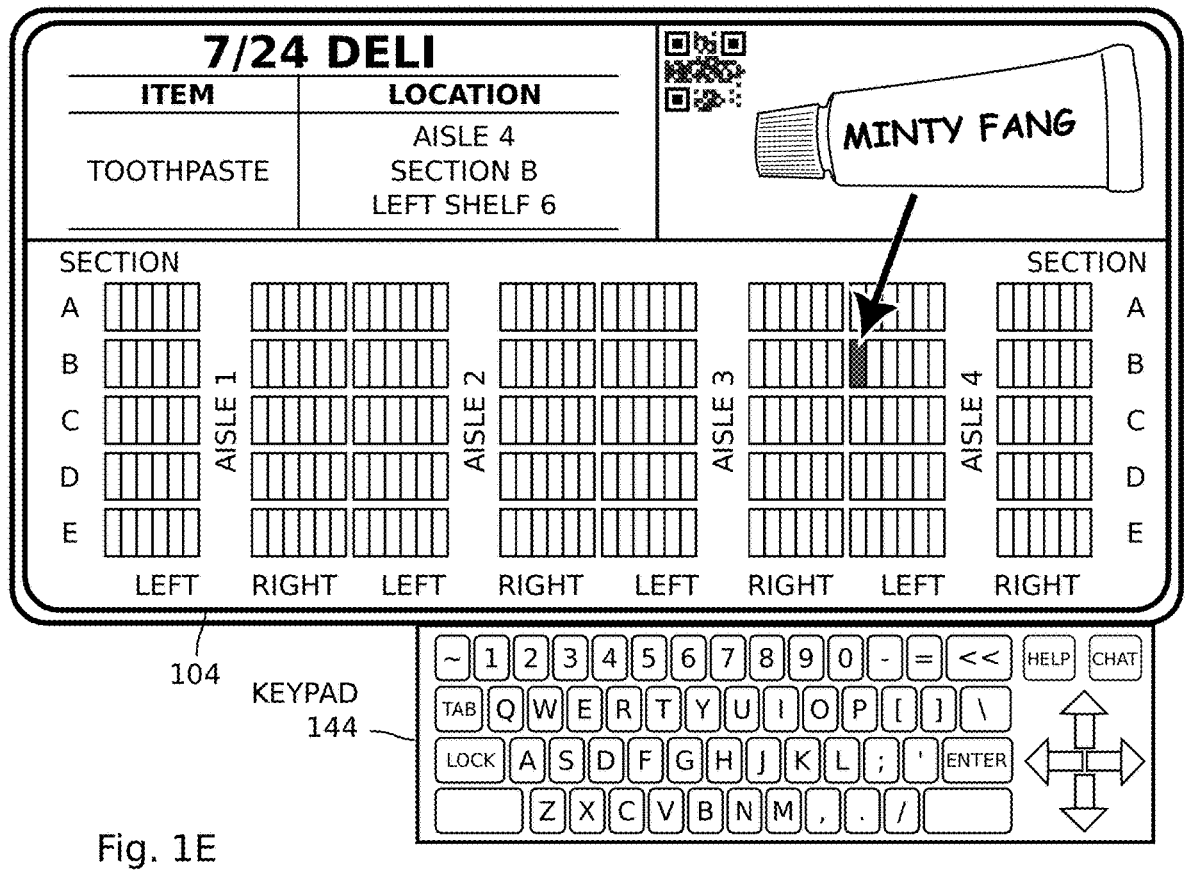
Figure 1D:
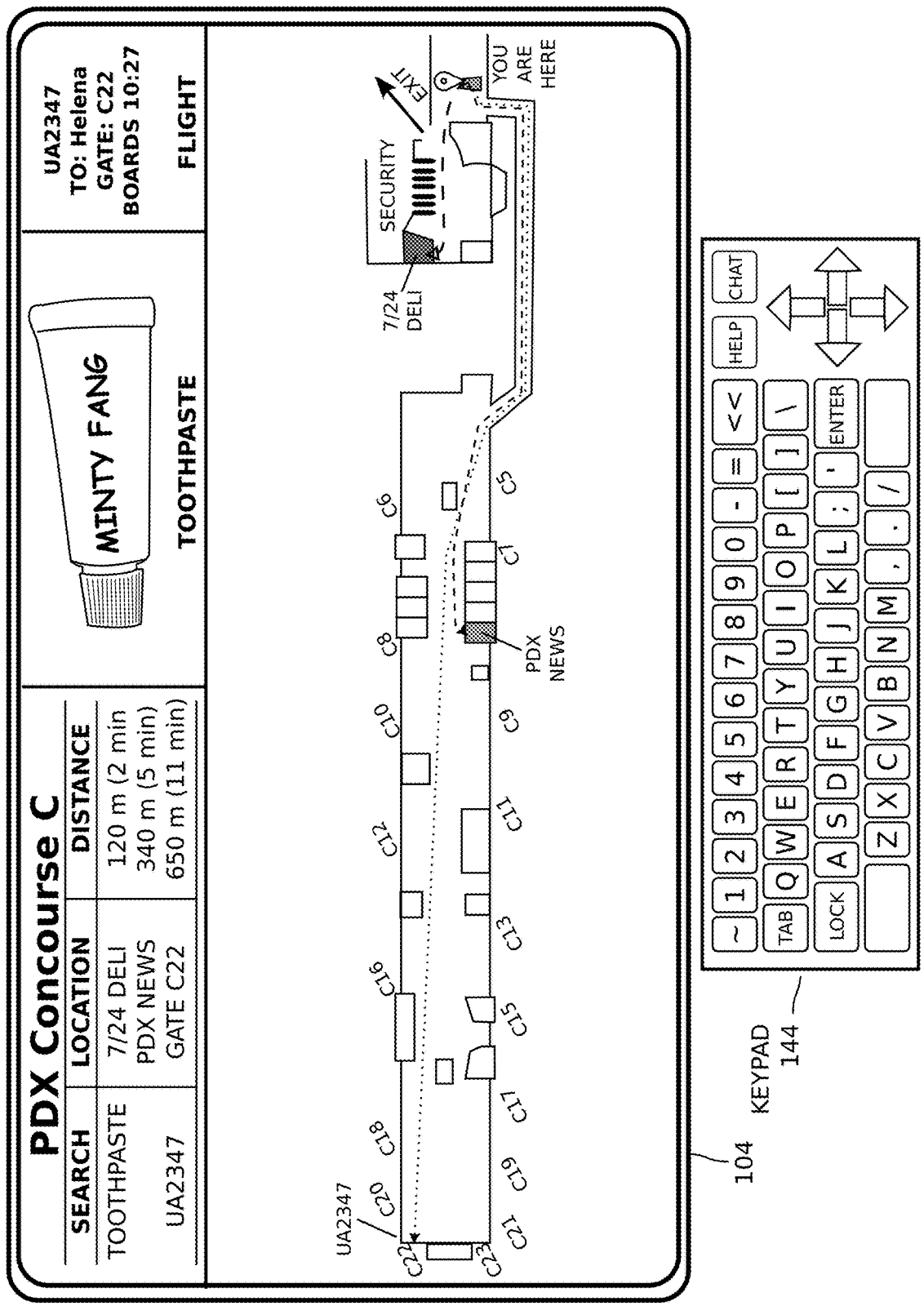

FIG. 1D depicts the portable kiosk being used as a directory system, in this case to find an item in a convenience store. The location of the items is presented in text, and directions are provided using a store map. FIG. 1E also shows the kiosk being used as a directory. In this case the directory is located in an airport. The location of the convenience store is listed in text and shown on an airport map. The kiosk directory also lists the time it should take to reach a particular gate from the kiosk, as well as an airport map providing directions to the gate from the kiosk location. Although not shown, the kiosk may also be used to provide travel and health advisories.

Figure 2A:
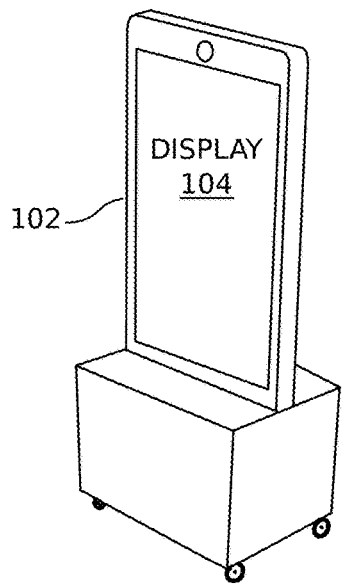
FIGS. 2A through 2G depict examples of portable kiosk types.
Figure 2B:
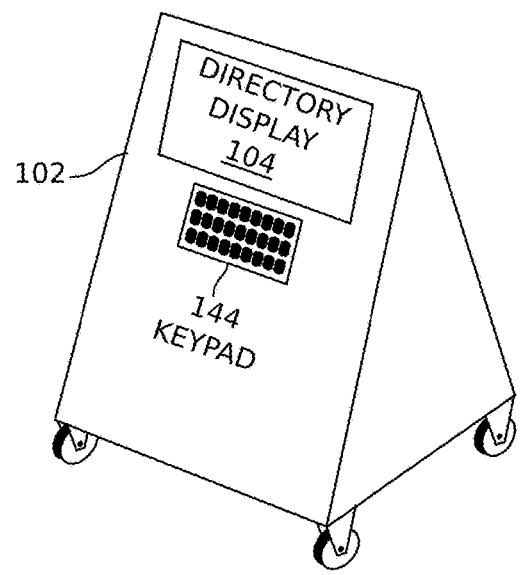

FIGS. 2A through 2G depict examples of portable kiosk types. FIG. 2A depicts a kiosk system 100 designed primarily for the projection of advertising or public service messages. FIG. 2B depicts a kiosk system 100 designed primarily as a directory. In this case the media projection subsystem 104 projects an electronic (digital) directory including a menu of features such as addresses, persons, services, businesses, events, and combinations thereof. The directory may also show the specific locations for item queries submitted by a pedestrian, e.g., toothpaste is located in Aisle 4, left, Section B, shelf 6 (see FIG. 1D). The MPS 104 may also include a map to help direct a user to a local feature. If the directory kiosk is likely to be placed in different locations, a location subsystem and mapping application, such as Google Maps, would be handy to insure that map directions are accurate. A user interface (e.g., keypad 144) to enter queries is also helpful.

Figure 2C:
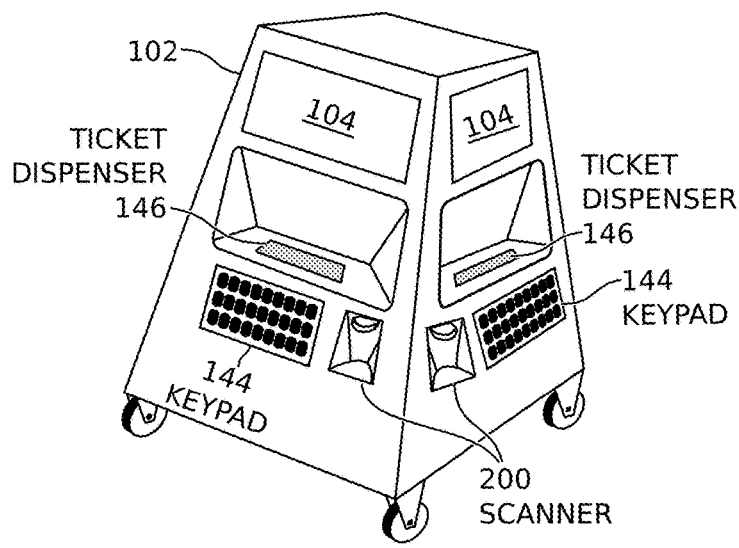
Figure 2D:
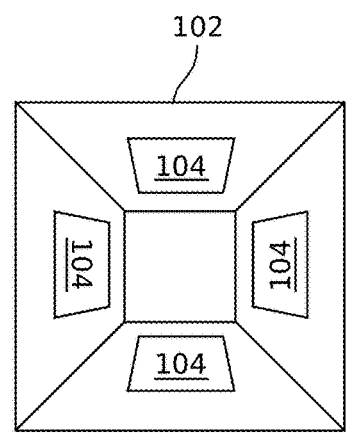

FIG. 2C depicts a kiosk designed primarily as a ticketing box office or ticketing portal. This system 100 comprises a pedestrian interface (UI) 144 attached to the kiosk chassis 102 that may include a keypad, a scanner 200 (as shown), microphones, camera, mouse, audio speaker, stylus, or touchscreen, or other conventional means of inputting information to a computer, for use by a human to read input authorization information such as personal information, banking information, a barcode, a quick response (QR) code, AirDrop message, text (SMS) message, WiFi message, Bluetooth message, or combinations thereof, to read input authorization information that may be personal information (e.g., name and address), banking information (e.g., an account number or credit card), or combinations thereof; The communications subsystem transmits the authorization information to the server and receives ticket data in response to the authorization information. As mentioned above, a ticket interface 146 may be a printer to supply paper tickets or a display (e.g., the MPS 104) to project electronic tickets using a wireless medium such as WiFi, Bluetooth, SMS, or AirDrop links, responsive to the ticket data. FIG. 2D is a plan, top-down view showing that the kiosk of FIG. 2C has 4 display screens 104.

Figure 2E:
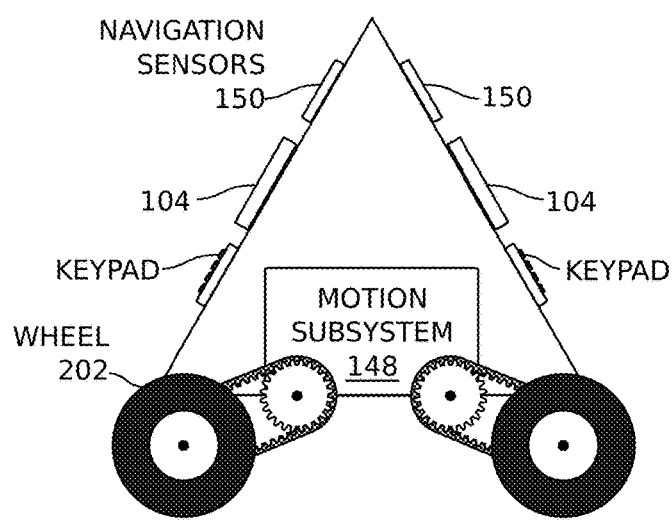

FIG. 2E is a partial cross-section view depicting a kiosk capable of motion. A distinction needs to be made between a portable kiosk and a mobile kiosk as defined herein. While a portable kiosk is capable of being moved, for example, by hand, on a cart, or using built-in wheels, in one aspect the portable kiosk is designed to display media only while stationary. Alternatively, the portable kiosk may also be mobile and able to display media while stationary, or while in motion. Thus, the kiosk system may further comprises a movement subsystem 148 attached to the kiosk chassis 102. In the simplest aspect, the kiosk chassis is mounted on wheels 200 and moved by (human) hand. In this arrangement, the kiosk may potentially be either portable or mobile. Alternatively, navigation sensors 150 may be attached to the kiosk chassis 102. Some examples of navigation sensors include a camera, LIDAR, thermal imaging sensor, RADAR, microphone, ultrasonic sensor, motion sensor, photodetector, the location subsystem mentioned above, and combinations thereof. In this case the local kiosk non-transitory memory may include an autonomous movement application (152, see FIG. 1A) stored in kiosk memory, including a sequence of processor executable steps for moving the kiosk chassis 102 in cooperation with the navigation sensors 150. This is an example of a mobile kiosk. At least Rivian Driver+, Google, and Tesla are known to have developed, and continue to develop applicable software programs to support autonomous driving, which could be adapted for use with a limited mobility kiosk. In another aspect, the kiosk may be motorized, but operated by hand.

Figure 2F:
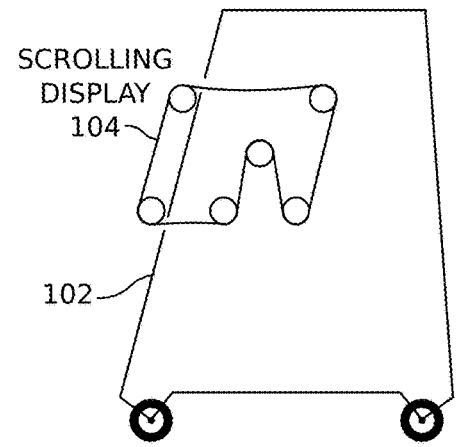
Figure 2G:
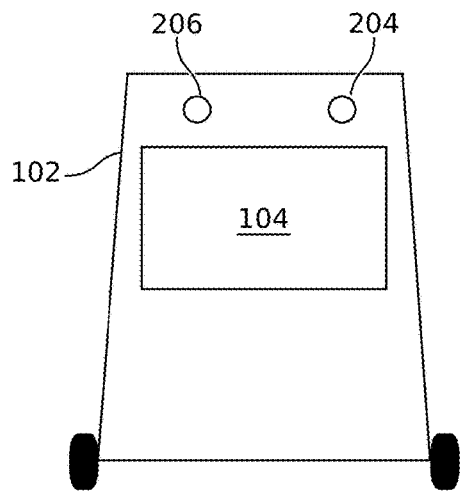

FIG. 2F is a partial cross-sectional view depicting the media projection subsystem as a hard-copy scrolling display 104 similar to player piano scrolling musical instructions. FIG. 2G is a scrolling displaying showing a UI mechanism 204 (a button in this example) for returning the display to a preferred media message, or in the case of the display consisting of a single message, the beginning of the message. UI mechanism 206 causes the media message to freeze in place. Although not explicitly shown in FIGS. 2A through 2E, these same mechanisms can be enabled to support digital displays.

Although not explicitly shown in these figures, the kiosk may also take a humanoid shape, with arms and legs, and the humanoid kiosk may also uses its legs to move.

In one aspect the kiosk may be used as a means of collecting user data. For example, the media projection subsystem may display QR codes that can be redeemed for something of value in response to a pedestrian entering information such as their phone number, address, personal information, of IP address to name a few example. As noted above, the pedestrian may also exchange information in response to communication services provided by the kiosk.

Returning to FIG. 1A, as is conventional, the server 118 may comprise a processor 154 and an operating system (OS) 156 stored in memory 122, as well as a communications subsystem 158. These computing structure components may be enabled through a system bus 160 and communications subsystem 158. The kiosk may potentially be enabled using hardware components and combinational logic circuits.

However, the kiosk 102 may typically use a computing device including the non-transitory memory 116, processor 162, OS 164, bus 108, and a peripheral interface 166.

The non-transitory memories 116 and 122 described herein may be any type or form of non-volatile storage device or medium capable of storing data and/or other computer-readable instructions. Examples of memories include, without limitation, Read Only Memory (ROM), flash memory, or any other suitable memory device. Although not required, in certain embodiments, the system described herein may include both a volatile memory unit and a non-volatile storage device. The memory may be implemented as shared memory and/or distributed memory in a network device.

For convenience, the above-mentioned software components are shown embedded as single schematic blocks, but it should be understood that these components are not necessarily embedded in a single hardware unit or server, or in communication with each other. Alternatively, the software applications may be cooperating components of an overall software system. The server may also represent a network of servers in communication with each other, such as a Blockchain system.

As noted above, a targeting subsystem 120 cross-references locations to weighted values. The weighted values may be used to determine prices, expenses, or rewards. For example, a kiosk provided in a high population density area may price differently due to higher demand. A "stationary location" may be a parking location. "Parking" is typically understood to be location where a kiosk is temporarily left, and may be without means of movement. Kiosks may be "parked" along city streets, sidewalks, or in publicly accessible areas, such as parking lots. Kiosks are typically "parked" for limited durations of time, typically a matter of hours, but the durations can be as small as minutes or larger than even weeks. In the present case, the portable kiosks described herein are "parked" in regions generally used by pedestrians, and sometimes exclusively used by pedestrians. As such, these custom purpose portable kiosk may be distinguished from larger vehicle-mounted display systems whose primary or originally intended purpose is to travel roadways, with the addition of after-market displays, local, and communication equipment. "Temporary" is understood to typically be a duration of several minutes to several hours, although it may also be a matter of days or even weeks. "Occupation" is understood to mean filling a space or location so completely that another physical entity is unable to fill that space.

As noted above, the MPS 104 may be an audio speaker and/or a visual screen or display. The visual display can also be a two-dimensional image projector displaying an image on a sidewalk, building wall, or a kiosk/vehicle side, or a three-dimensional image (i.e., hologram) projector. In addition to using a LED or LC display, the media projection subsystem 104 may use an image projector, a retractable screen, a topper, holographic display, a light emitting diode display, wallscape, electroluminescent (EL) display, switchable glass displays, persistent image fan, or combinations thereof. The media projection subsystem may be an image projector enabled as a liquid crystal (LC) or LED display similar to a home theater type video projector. Alternatively, high performance (e.g., mercury arc or xenon arc) lamps, cathode ray tube (CRT), digital light processing (DLP), plasma, silicon X-tal reflective display (SXRD), or red-green-blue (RGB) lasers may be used. In other words, the media projection subsystem 104 may present a 2-dimensional or 3-dimensional image, which may or may not be transitory. Transitory images include a series of still images, videos, or combinations thereof. The media projection subsystem 104 may also broadcast audio messages, or a combination for audio and visual messages.

In some aspects, as an alternative or in addition to the kiosk MPS 104 being engaged, the media message may be pushed to a personal device 178, such as smartphone or personal computer via a wireless medium such as AirDrop, which is engaged when the personal device 178 is in close contact with the kiosk 102. WiFi, text (SMS), or Bluetooth wireless mediums may be used to communicate the media messages to the personal device 178. As an alternative, or in addition, the kiosk 102 may act as an application store, or enable connections to a conventional application store, so that a proprietary application or website 180 can be downloaded that permits a user to receive media messages. The media messages may be supplied, for example, as a consequence of the user engaging the kiosk, or proprietary application/website 180 related communication services being used. Voluntary use of the proprietary application/website 180 services may entail the collection of the personal device IP address and/or user personal information for data collection purposes.

Figure 3:
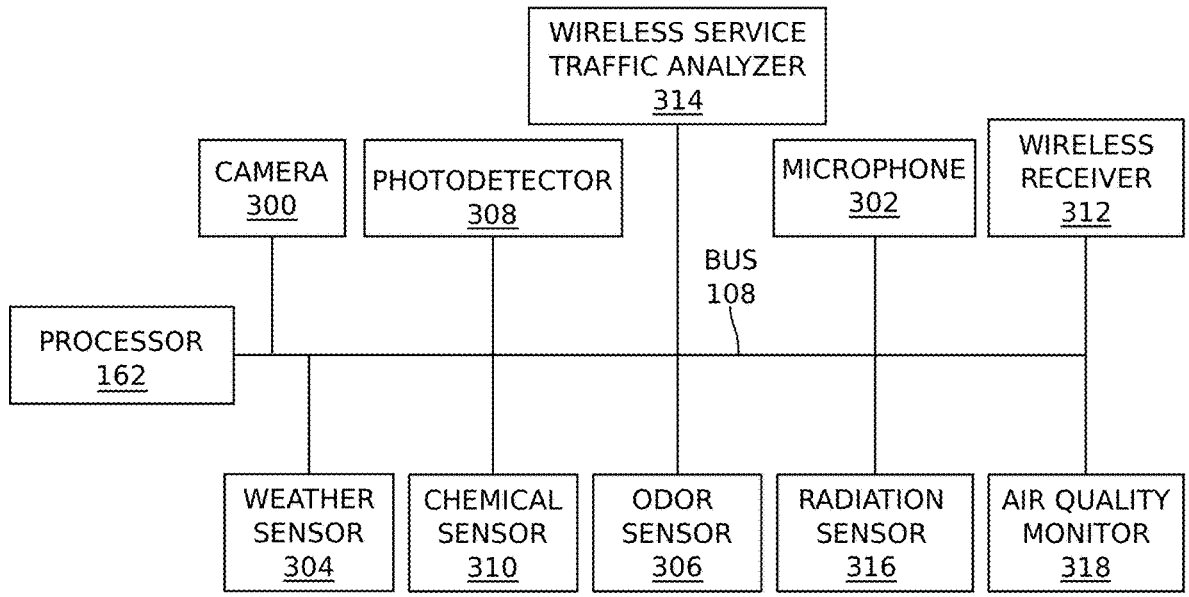
FIG. 3 is a schematic block diagram depicting local environment sensors.

FIG. 3 is a schematic block diagram depicting local environment sensors. The system 100 may further receive local environmental data from local environment sensors 140. The environment sensor components may include a camera 300, microphone 302, weather sensors 304, odor sensors 306, photodetectors 308, chemical sensors 310, a wireless spectrum receiver 312, a wireless service traffic analyzer 314, radiation sensors 316, air quality monitors 318, and combinations thereof. The communications subsystem may transmit the environmental data to the server or an associated data collection or public service server for public safety, traffic, and weather services. In one aspect, the targeting subsystem weighted valuation subsystem (142, see FIG. 1A is updated in response to the local environment data.

As noted above, the kiosk chassis of FIG. 1A may further comprise a publically accessible device 138 such as a WLAN AP, a WPAN AP, and combinations thereof. In this case the communications subsystem 112 may enable AP data traffic via a communications subsystem cellular network, and/or in addition, communicate with the server 118, which may collect, store, or pass along related data to other server entities (not shown). Alternatively, but less common, the access point may an IEEE 802.15.4 Zigbee, WPAN IEEE 802.15 Li-Fi or wireless USB device. Even more unlikely as an access point are Long Range Wireless systems. As used herein, a "publically accessible" is a system that can be accessed by the general public without a password or similar security measures, or where the password is publically distributed. One example of a publically accessible AP is the WiFi hotspot service provided by a typical Starbucks coffee shop. In the case of a password being required for access, the password may be printed on the kiosk, displayed by the media projection subsystem, or made available through a kiosk phone application or website.

As noted above, the server 118 may include a targeting or subsystem 120 with a valuation subsystem 142. The values may be linked to a reward, based for example upon location population density, neighborhood safety, type of service, type of media, duration of media, or time of day to name a few examples. As noted above, the (weighted) value may be cross-referenced to stationary locations. Weighted values can be established using geo-fencing services, such as provided by Radar Labs, Inc. Geo-fencing uses technologies like GPS, radio frequency identification (RFID), WiFi, cellular data, and internet protocol (IP) address ranges, to build virtual fences in geographic regions. These virtual fences can be used to track the physical location of a device (e.g., smartphone) active in the particular region or the fence area. The location of the person using the device is taken as geocoding data and can be used construct a picture of Internet Protocol (IP) traffic in those areas. However, the geo-fencing information used to support the above-described valuation table is typically not instantaneously updated. To support instantaneous real-time updates, the valuation subsystem may receive local environment data, as described above. As noted above, a kiosk is potentially able to supply local environment data from a camera, microphone, odor sensor, photodetector, chemical sensor, wireless spectrum receiver (e.g., detecting the noise floor in Bluetooth, WiFi, or cellular bands), wireless service traffic analyzer (e.g., detecting traffic through a publically accessible AP or the above-mentioned geo-fencing technologies), radiation sensor, local weather sensor (e.g., temperature or rain), and/or air quality monitor.

Examples of a location subsystem 128 include a Global Positioning Satellite (GPS) system receiver, Global Navigation System (GNSS), assisted GPS or GNSS taking advantage of cell tower data, a Wireless Local Area Network IEEE 802.11 (WiFi) positioning system, cell-site multilateration (e.g., Skyhook), satellite multilateration, or a hybrid positioning system. Hybrid positioning systems find locations using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796, 340, which is incorporated herein by reference, camera images and the location data of proximate smartphones, laptops, and personal communication devices can also be used to determine location.

The most typical examples of the communications subsystem 112 are wireless cellular systems (e.g., Global System for Mobile Communications (GSM), Universal Mobile Telecommunications System (UMTS)-time division duplexing (TDD), Long-Term Evolution (LTE), $4^{th}$ Generation (4G), or $5^{th}$ Generation (5G)), and the like. Less typically, the communications subsystem 112 may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, and IEEE 802.16 Worldwide Interoperability for Microwave Access (WiMAX (WiBro)). The system 100 is not limited to any particular type of communication subsystem. For simplicity, FIG. 1A depicts a direct wireless communications link between the kiosk and the server. However, it should be understood that a typical cellular link includes intervening base station and hardline connections. The location subsystem 128 may also include a motion detector to help determine if the kiosk is stationary.

As noted above, the access point 138 and/or communications subsystem 112 can be used to collect data from entities passing by, or engaging with the access point or using the communications subsystem. This data can be stored in local memory data module 168 for subsequent recovery or transmission to the server in support of data gathering or geo-fencing data. In support of data mapping, the access point is publically accessible to user devices that include smartphones, personal devices, or generally any type of computing device. Typically, the user devices are enabled for WiFi and Bluetooth communications. Data can also be collected using text (SMS) or AirDrop type communications. If left enabled, as is the typical case for many users, the user device is able to interact with a nearby access point even if a communication data link is not established. As used herein, the term data mapping includes the collection of data from the user devices. In one aspect, user data information (e.g., addresses) is collected voluntarily, with the user explicitly agreeing to data collection in response to an access point or communication provided services, such as the provision of an Internet browser, email, Internet, or social media services. For example, if the access point is a WiFi hotspot that accepts Uniform Resource Locator (URL) address requests from a user device (e.g., a smartphone), the URL address requests may be transmitted to a Domain Name System (DNS) service 170 embedded with, or in communication with the server 118. The DNS service makes address searches. Otherwise, the information is collected without an explicit agreement by the user, where legal. Rewards to entities may be based upon the volume of traffic through the WiFi hotspot or access point data collected. In some aspects, camera images, in cooperation with a facial recognition software application 172 (e.g., DeepFace), are used for data tracking.

As noted above, the system 100 may include a publically accessible cellular signal booster 138, such as a device provided by WeBoost, or a similarly functioning proprietary device. The signal booster may be independent of, or use the communications subsystem 112, as shown. The booster may act as a relay between a proximately located user cellular device and a cellular network (i.e., base station or satellite). In other aspects, the publically accessible device 138 is an Internet signal booster that acts to relay Internet signals, such as might be useful when employed with the StarLink or similar Internet service, as the StarLink ground units require an uninterrupted view of the sky (i.e., view of the StarLink satellites) For example, the kiosk may be positioned in areas of weak cellular coverage. Improved cellular coverage necessarily improves Internet and WiFi services carried by the cellular service.

As used herein, an "entity" or "user" may be a person, a business, a corporation, any type of social organization or business unit, a physical device, or a software application. For simplicity, the entities may be identified as the hardware components being used by, or associated with a business, person, corporation, or social organization. In this case, the entity may be described as a computer, smartphone, media projection subsystem, server, or vehicle, to name a few examples.

As noted above, the kiosk may include a camera to record images of the proximate geographic location. The camera images may be stored in local memory data module 168, or the communications subsystem 112 may transmit the images. In one aspect, the camera may also be used to modify the value of the kiosk location. For example, the recorded traffic in a location may be greater than anticipated, and the weighted value adjusted accordingly. That is, images recording higher pedestrian or vehicular traffic may indicate, at least temporarily, a greater location value. The data may be used to help determine the efficacy of the media or location. Alternatively or in addition, the camera images my act to verify a particular location.

Figure 4:
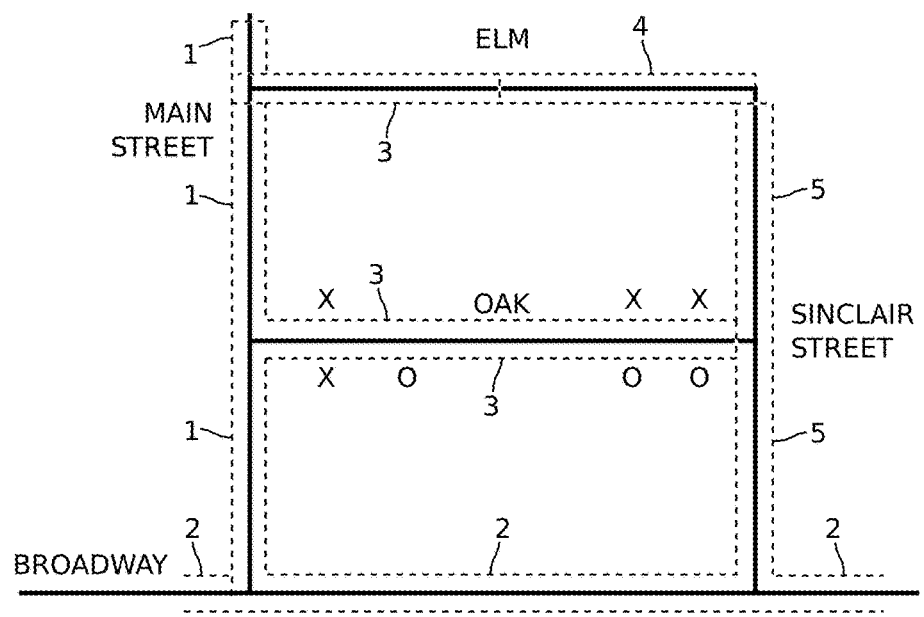
FIG. 4 is a plan view of geographic regions cross-referenced to the weighted value of various locations.

FIG. 4 is a plan view of geographic regions cross-referenced to the weighted value of various locations. As shown, regions along Main Street have a value of 1, the highest rated value. The regions along Broadway have a value of 2. The regions along Oak have a value of 3. The region along Elm near Main Street have a value of 3, which decreases to a value of 4 near Sinclair Street, and the regions along Sinclair Street have a value of 5. The site table subsystem may include a listing of kiosk occupied spaces along Oak Street (as marked with an "x"), as may list a stationary location along Oak Street (as marked with an "o") available for selection.

Figure 5:
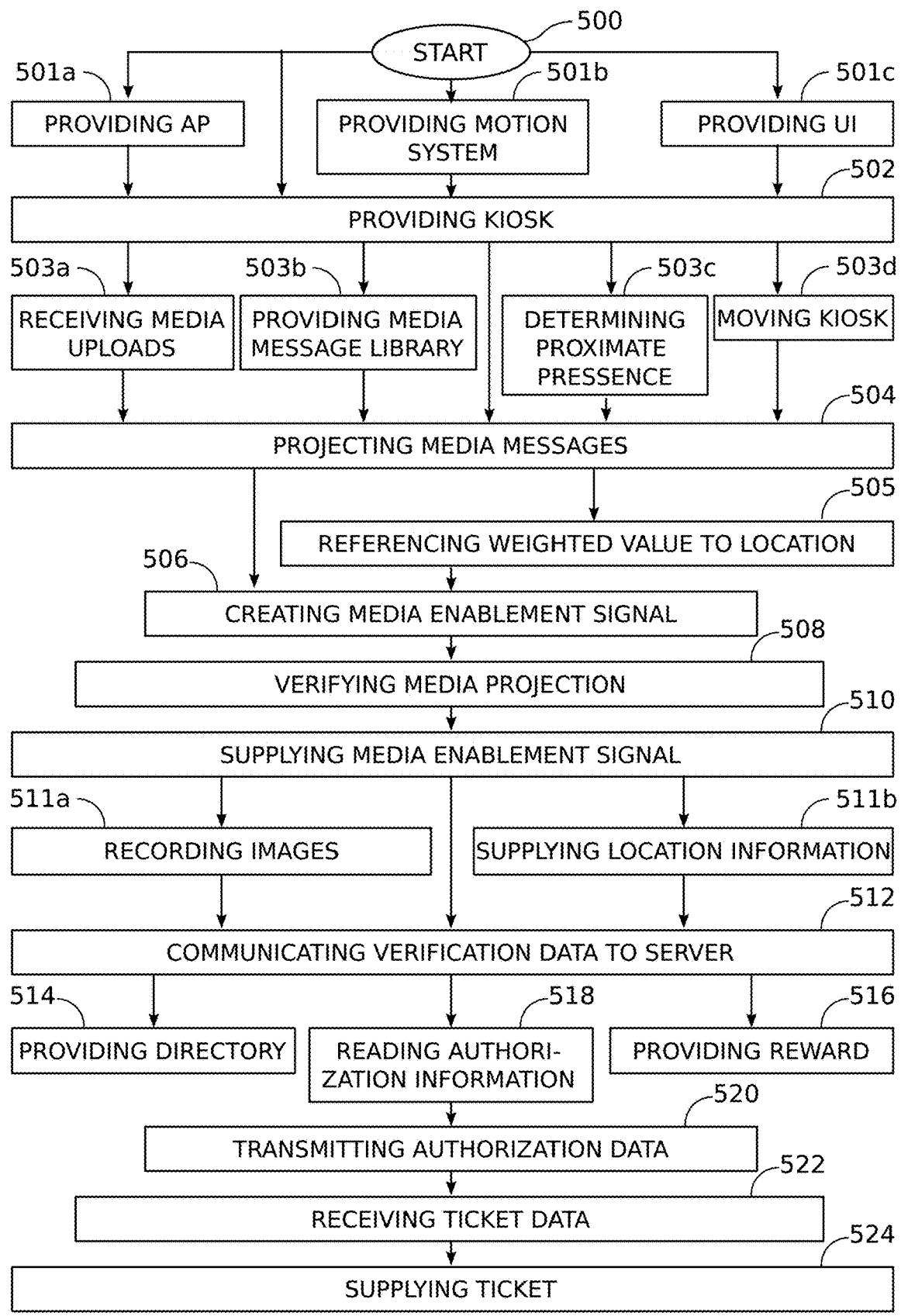
FIG. 5 is a flowchart illustrating a method for pedestrian thoroughfare portable kiosk media projection.

FIG. 5 is a flowchart illustrating a method for pedestrian thoroughfare portable kiosk media projection. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 500.

Step 502 provides a portable kiosk chassis located in a pedestrian thoroughfare. A pedestrian thoroughfare is understood to an area that is frequented by pedestrians and nearby foot traffic, but not vehicular traffic. A typical pedestrian thoroughfare is a sidewalk. Step 504 uses a media projection subsystem to project a media message, and Step 506 creates a media enablement signal in response to media being projected. In some cases, the media enablement signal is created when media is projected from a stationary location. The projected media may be a displayed image, broadcast sound, or a combination thereof. Step 508 verifies that media has been projected in response to receiving a media enablement signal. Step 510 supplies verification information including the media enablement signal. Step 512 communicates the verification information to a server. Communications can be stored in local memory or transmitted using a device such as a cellular telephone, a WLAN device, a WPAN device, and combinations thereof. In one aspect, Step 512 provides a publically accessible device such as a cellular telephone booster, Internet signal booster, a WLAN AP, WPAN AP, or combinations thereof.

In one aspect, Step 505 cross-references a weighted value to a kiosk chassis location. The weighted value may be responsive to proximate vehicular traffic, line of sight, proximate pedestrian traffic, height, proximity to cultural events, proximity to cultural facilities, a type of media being projected, a time of day, a day of the week, a date, a length of time the media is projected, type of display, number of kiosk displays, type of kiosk, and combinations thereof.

In one aspect, Step 503a receives media uploads from the server for projection by the media projection subsystem. Alternatively, Step 503b provides a media message library stored in a local kiosk non-transitory memory and Step 504 projects the media messages stored in the media message library. In one aspect, Step 503c determines the proximate presence of pedestrians, and projecting a media message in Step 504 includes selectively engaging the media detection subsystem in response to determining the proximate pedestrian presence.

In another aspect, Step 511a records images of a geographic location proximate to the kiosk chassis, which can be communicated to the server. Optionally, Step 511b uses a location subsystem attached to the kiosk chassis to supply location information that is communicated to the server in Step 512. In this variation, verifying that media has been projected in Step 508 includes supplying verification information including a location enablement signal when the kiosk chassis is stationary for a predetermined minimum duration of time. As another means of locating the kiosk, Step 501a may provide a proximately located WLAN AP, a WPAN AP, or combinations thereof, that relays communications between the kiosk and the server, with the understanding that the kiosk location is closely located to the AP.

In one aspect, Step 514 provides a directory including a menu of features such as addresses, persons, services, businesses, events, the locations of specific items in a nearby facility, and combinations thereof. In another aspect, Step 501b provides a movement subsystem attached to the kiosk chassis. The movement subsystem may include location sensors such as a camera, LIDAR, thermal imaging sensor, RADAR, microphone, ultrasonic sensor, motion sensor, photodetector, a location subsystem, and combinations thereof, and well as an autonomous movement application stored in a local kiosk transitory memory. Then, Step 503d moves the kiosk chassis using the autonomous driving application in cooperation with the location sensors.

The kiosk chassis provided in Step 502 may be managed by a first entity, but the media projected in Step 504 may be a media message supplied by, or provided on behalf of, a second entity. In that case, Step 516 may provide a reward to the first entity from the second entity in response to the projection of the second entity supplied media message. The reward may, for example, be use of the kiosk for some first entity media messages. Thus, Step 504 may additionally project a media message supplied by, or provided on behalf of the first entity. In one aspect, Step 501d provides a manager UI for selecting a media message distribution format that selects media associated with the first entity, media associated with the second entity, and media associated with a third entity affiliation of local kiosks.

In another variation, Step 501d may provide a user interface attached to the kiosk chassis, which may include, among other conventional mechanisms, a keypad and/or scanner. Step 518 uses the UI to read input authorization information such as personal information, banking information, a barcode, a quick response (QR) code, wireless medium messaging, and combinations thereof. Step 520 transmits the authorization information to the server. Step 522 receives ticket data in response to the authorization information, and Step 524 supplies tickets in the form of paper tickets, electronic tickets, or acts as a gatekeeper in responsive to the ticket data, as described in detail above.

Systems and methods have been provided for a pedestrian kiosk media projection system. Examples of particular message structures, schematic block linkages, and hardware units have been presented to illustrate the invention. However, the invention is not limited to merely these examples. Other variations and embodiments of the invention will occur to those skilled in the art.

We claim:

1. A pedestrian thoroughfare portable kiosk media projection system comprising:
 a pedestrian thoroughfare portable kiosk chassis;
 a media projection subsystem attached to the kiosk chassis comprising an interface to receive media, an interface to selectively project the media, and an interface to supply a media enablement signal in response to the media being projected when the kiosk chassis is stationary;
a verifier having an interface to receive the media enablement signal and an interface to supply verification information including the media enablement signal; and,
a kiosk communications subsystem having an interface to receive the verification information and an interface to communicate the verification information to a server;
further comprising:
a targeting subsystem cross-referencing a weighted value to a kiosk chassis stationary location;
wherein the kiosk chassis stationary location weighted value is responsive to factors selected from the group consisting of proximate vehicular traffic, line of sight, proximate pedestrian traffic, height, proximity to cultural events, proximity to cultural facilities, a type of media beina projected, a time of day, a day of the week, a date, a length of time the media is projected, type of kiosk, number of kiosk displays, and combinations thereof.

2. The system of claim 1 wherein the media projection subsystem projects media selected from the group consisting of a displayed image, broadcast sound, phone application download, website download, or a combination thereof.

3. The system of claim 1 wherein the kiosk communications subsystem receives media uploads from the server and provides the media uploads to the media projection subsystem for projection.

4. The system of claim 1 wherein the kiosk communication subsystem comprises a device selected from the group consisting of a cellular telephone, a cellular communications booster, an Internet communications booster, an IEEE 802.11 Wireless Local Area Network (WLAN) device, an IEEE 802.15 Wireless Personal Area Network (WPAN) device, and combinations thereof.

5. The system of claim 1 further comprising:
a local kiosk non-transitory memory;
a media message library stored in the kiosk memory; and,
wherein the media projection subsystem receives media messages, from the library in kiosk memory, for projection.

6. The system of claim 1 further comprising:
a location subsystem attached to the kiosk chassis to supply location information to the verifier; and,
wherein the verifier includes the location information in the verification information supplied to the kiosk communication subsystem.

7. The system of claim 1 wherein the verifier has an interface to receive the location information and an interface to supply verification information including a location enablement signal when the kiosk chassis is stationary for a predetermined minimum duration of time.

8. The system of claim 1 further comprising:
a proximately located access point (AP) selected from the group consisting a WLAN AP, a WPAN AP, or combinations thereof, relaying communications between the kiosk communication subsystem and the server; and,
wherein the kiosk communications subsystem includes a device selected from the group consisting of a WLAN device, WPAN device, or combinations thereof to communicate with the AP.

9. The system of claim 1 wherein the media projection subsystem comprises an electronic directory including a menu of features selected from the group consisting of addresses, persons, local services, local businesses, local events, the location of specified items in an adjacent facility, and combinations thereof.

10. The system of claim 1 further comprising:
a movement subsystem attached to the kiosk chassis.

11. The system of claim 10 further comprising:
location sensors selected from the group consisting of a camera, LIDAR, thermal imaging sensor, RADAR, microphone, ultrasonic sensor, thermal detector, motion sensor, photodetector, a location subsystem, and combinations thereof;
a local kiosk non-transitory memory; and,
an autonomous movement application stored in kiosk memory, including a sequence of processor executable steps, for moving the kiosk chassis in cooperation with the location sensors.

12. The system of claim 1 wherein the kiosk chassis is managed by a first entity; wherein the media projection subsystem projects a first mega message supplied by a second entity; and, the system further comprising: a valuation subsystem operathely providing a reward to the first entity from the second entity in response to the projection of the first media message.

13. The system of claim 1 further comprising: a manager user interface (UI) permitting the selection of media messages selected from the group consisting of media associated with the first entity, media associated with the second entity, and a third entity media associated with an affiliation of local kiosks.

14. The system of claim 1 further comprising:
a pedestrian user interface attached to the kiosk chassis selected from the group consisting of a keypad, touchscreen, camera, microphone, wireless medium, and a scanner to read pedestrian authorization information selected from the group consisting of personal information, banking information, a barcode, a quick response (QR) code, and combinations thereof;
wherein the kiosk communication subsystem transmits the pedestrian authorization information and receives ticket data in response to the pedestrian authorization information; and,
the system further comprising:
a ticket interface selected from the group consisting of a printer to supply paper tickets and a medium to project electronic tickets, responsive to the ticket data.

15. The system of claim 1 further comprising:
sensors to receive local environment data from a device selected from the group consisting of a camera, microphone, weather sensor, odor sensor, photodetector, chemical sensor, wireless spectrum receiver, wireless service traffic analyzer, radiation sensor, air quality monitor, and combinations thereof; and,
wherein the kiosk communication subsystem transmits the local environment data to the server.

16. The system of claim 1 further comprising:
a proximity detection device connected to the kiosk chassis to supply a detection signal in response to determining the proximate presence of pedestrians; and,
wherein the media detection subsystem is selectively engaged in response to the detection signal.

17. A method for pedestrian thoroughfare portable kiosk media projection, the method comprising:
providing a portable kiosk chassis located in a pedestrian thoroughfare;
using a media projection subsystem, projecting a media message from the kiosk;

creating a media enablement signal when media is projected while the kiosk is stationary;
verifying the media enablement signal;
supplying verification information including the media enablement signal; and,
communicating the verification information to a server;
further comprising:
a targeting subsystem cross-referencing a weighted value to a kiosk chassis stationary location;
wherein the kiosk chassis stationary location weighted value is responsive to factors selected from the group consisting of proximate vehicular traffic, line of sight, proximate pedestrian traffic, height, proximity to cultural events, proximity to cultural facilities, a type of media being projected, a time of day, a day of the week, a date, a length of time the media is projected, type of kiosk, number of kiosk displays, and combinations thereof.

18. The method of claim 17 further comprising:
receiving media uploads from the server for projection by the media projection subsystem.

19. The method of claim 17 further comprising:
recording local environment data using a device selected from the group consisting of a camera, microphone, weather sensor, odor sensor, photodetector, chemical sensor, wireless spectrum receiver, wireless service traffic analyzer, radiation sensor, air quality monitor, and combinations thereof; and,
wherein communicating the verification information includes communicating the local environment data to the server.

20. The method of claim 17 further comprising:
providing a media message library stored in a local kiosk non-transitory memory; and,
wherein projecting the media message includes projecting the media messages stored in the media message library.

21. The method of claim 17 further comprising:
using a location subsystem attached to the kiosk chassis, supplying location information; and,
wherein communicating the verification information includes communicating the location information to the server.

22. The method of claim 21 wherein verifying that media has been projected includes supplying verification information including a location enablement signal when the kiosk chassis is stationary for a predetermined minimum duration of time.

23. The method of claim 17 further comprising:
providing a directory including a menu of features selected from the group consisting of addresses, persons, local services, local businesses, local events, specific locations of items in a proximately located facility, and combinations thereof.

24. The method of claim 17 providing a publically accessible device selected from the group consisting a cellular signal booster, an Internet signal booster, a WLAN access point (AP), WPAN AP, and combinations thereof.

* * * * *

UNITED STATES PATENT AND TRADEMARK OFFICE
CERTIFICATE OF CORRECTION

PATENT NO. : 11,741,500 B2
APPLICATION NO. : 17/983545
DATED : August 29, 2023
INVENTOR(S) : Peter Ta, John Sullivan and Gerald Maliszewski It is certified that error appears in the above-identified patent and that said Letters Patent is hereby corrected as shown below:

In the Claims

Column 16
A correct version of Claim 12 is presented below:
12. The system of claim 1 wherein the kiosk chassis is managed by a first entity;
    wherein the media projection subsystem projects a first media message supplied by a second entity; and, the system further comprising:
    a valuation subsystem operatively providing a reward to the first entity from the second entity in response to the projection of the first media message.

Signed and Sealed this
Twenty-fourth Day of October, 2023

*Katherine Kelly Vidal*

Katherine Kelly Vidal
*Director of the United States Patent and Trademark Office*